US009712667B2

(12) United States Patent
Nerst et al.

(10) Patent No.: US 9,712,667 B2
(45) Date of Patent: Jul. 18, 2017

(54) IDENTIFYING NETWORK ENTITIES IN A PEER-TO-PEER NETWORK

(75) Inventors: Alex Nerst, Ashdod (IL); Avi Shechter, Ramot Hashavim (IL); Boaz Zilberman, Ramat Hasharon (IL)

(73) Assignee: Genband US LLC, Plano, TX (US)

( * ) Notice: Subject to any disclaimer, the term of this patent is extended or adjusted under 35 U.S.C. 154(b) by 366 days.

(21) Appl. No.: 12/307,767

(22) PCT Filed: Jun. 20, 2007

(86) PCT No.: PCT/IL2007/000751
§ 371 (c)(1),
(2), (4) Date: Oct. 4, 2009

(87) PCT Pub. No.: WO2008/004207
PCT Pub. Date: Jan. 10, 2008

(65) Prior Publication Data
US 2010/0049873 A1    Feb. 25, 2010

Related U.S. Application Data

(60) Provisional application No. 60/806,738, filed on Jul. 7, 2006.

(51) Int. Cl.
*G06F 15/16* (2006.01)
*H04M 3/42* (2006.01)
(Continued)

(52) U.S. Cl.
CPC .. *H04M 3/42034* (2013.01); *H04L 29/12103* (2013.01); *H04L 61/1535* (2013.01);
(Continued)

(58) Field of Classification Search
CPC .......... H04L 29/12103; H04L 61/1535; H04M 2207/18; H04M 3/42034; H04M 7/0063; H04M 7/128
(Continued)

(56) References Cited

U.S. PATENT DOCUMENTS 6,069,896 A     5/2000  Borgstahl et al.
6,282,183 B1 *  8/2001  Harris et al. .................. 370/338
(Continued)

FOREIGN PATENT DOCUMENTS

WO    WO2005/122541    12/2005
WO    WO 2005/122541   12/2005
(Continued)

OTHER PUBLICATIONS

Camarillo et al., "ISUP to SIP Mapping", Aug. 2001, Internet Engineering Task Force, section 1 and 6.1.1.*
(Continued)

*Primary Examiner* — Davoud Zand
(74) *Attorney, Agent, or Firm* — Haynes and Boone, LLP

(57) ABSTRACT

A method and a system for identifying a network entity within a first communication network, using an entity identification data of the network entity in a second communication network. More particularly but not exclusively, identifying a network entity within a peer-to-peer communication network, using an entity identification data of the network entity in an underlying conventional communication network.

28 Claims, 4 Drawing Sheets

(51) Int. Cl.
*H04L 29/12* (2006.01)
*H04M 7/00* (2006.01)
*H04M 7/12* (2006.01)

(52) U.S. Cl.
CPC ......... *H04M 7/0063* (2013.01); *H04M 7/128* (2013.01); *H04M 2207/18* (2013.01)

(58) Field of Classification Search
USPC ................................ 709/217, 218, 219, 245
See application file for complete search history.

(56) References Cited

U.S. PATENT DOCUMENTS

| | | | |
|---|---|---|---|
| 6,393,434 B1* | 5/2002 | Huang et al. | |
| 6,421,347 B1 | 7/2002 | Borgstahl et al. | |
| 6,661,799 B1* | 12/2003 | Molitor | 370/401 |
| 6,721,412 B1 | 4/2004 | Youngs | |
| 6,961,575 B2* | 11/2005 | Stanforth | 455/445 |
| 7,181,620 B1 | 2/2007 | Hur | |
| 7,272,636 B2* | 9/2007 | Pabla | 709/216 |
| 7,328,280 B2* | 2/2008 | Takeda et al. | 709/245 |
| 7,401,153 B2* | 7/2008 | Traversat et al. | 709/230 |
| 7,480,257 B2* | 1/2009 | Sakano et al. | 370/255 |
| 7,548,758 B2* | 6/2009 | Periyalwar et al. | 455/517 |
| 7,613,772 B2* | 11/2009 | Bartram et al. | 709/205 |
| 7,631,045 B2* | 12/2009 | Boerries et al. | 709/206 |
| 7,783,749 B2* | 8/2010 | Hopkins | 709/224 |
| 7,817,647 B2* | 10/2010 | Lieuallen et al. | 370/401 |
| 7,849,199 B2* | 12/2010 | Schulz et al. | 709/228 |
| 7,853,696 B2* | 12/2010 | Caballero-McCann et al. | 709/227 |
| 7,877,106 B2* | 1/2011 | Periyalwar et al. | 455/517 |
| 7,899,172 B2* | 3/2011 | Poustchi et al. | 379/211.02 |
| 7,912,046 B2* | 3/2011 | Li et al. | 370/389 |
| 8,036,360 B1 | 10/2011 | Gogineni et al. | 379/207.05 |
| 2002/0010789 A1* | 1/2002 | Lord | H04N 21/235 709/231 |
| 2002/0176559 A1* | 11/2002 | Adamek | H04M 3/428 379/215.01 |
| 2003/0095546 A1 | 5/2003 | Sakano et al. | |
| 2004/0143633 A1 | 7/2004 | McCarty et al. | |
| 2004/0148317 A1* | 7/2004 | Sundararajan et al. | 707/201 |
| 2004/0148434 A1 | 7/2004 | Matsubara et al. | |
| 2004/0177048 A1 | 9/2004 | Klug et al. | |
| 2004/0203636 A1 | 10/2004 | Chan et al. | |
| 2004/0203638 A1 | 10/2004 | Chan et al. | |
| 2004/0258233 A1 | 12/2004 | Poustchi et al. | |
| 2005/0004881 A1 | 1/2005 | Klug et al. | |
| 2005/0014465 A1 | 1/2005 | Rupp et al. | |
| 2005/0015506 A1 | 1/2005 | Padborg et al. | |
| 2005/0091316 A1 | 4/2005 | Ponce et al. | |
| 2005/0117525 A1* | 6/2005 | Poustchi et al. | 370/254 |
| 2005/0122965 A1 | 6/2005 | Heinla et al. | |
| 2005/0135349 A1 | 6/2005 | Poustchi et al. | |
| 2005/0198299 A1 | 9/2005 | Beck et al. | |
| 2005/0256907 A1* | 11/2005 | Novik et al. | 707/200 |
| 2005/0268109 A1 | 12/2005 | McIntosh et al. | |
| 2006/0007915 A1 | 1/2006 | Frame | |
| 2006/0019698 A1 | 1/2006 | Ahya | |
| 2006/0072542 A1* | 4/2006 | Sinnreich | H04L 12/2854 370/351 |
| 2006/0193265 A1* | 8/2006 | Simionescu et al. | 370/254 |
| 2006/0209819 A1 | 9/2006 | Jennings, III et al. | |
| 2007/0091848 A1* | 4/2007 | Karia | H04L 29/06027 370/331 |
| 2008/0114898 A1* | 5/2008 | Takeda | H04L 29/06027 709/245 |
| 2010/0049873 A1* | 2/2010 | Nerst et al. | 709/245 |

FOREIGN PATENT DOCUMENTS

WO    WO 2005/122541 A2    12/2005
WO    WO2007031981    3/2007

OTHER PUBLICATIONS

Canadian Patent Office, Office Action mailed Sep. 6, 2013, for Application No. 2657094, 3 pages.
Canadian Intellectual Property Office, Examination Search Report mailed Nov. 27, 2014 for Application No. 2,657,094, 4 pages.
Canadian Intellectual Property Office, Office Action mailed Jan. 5, 2015 for Application No. 7,766,792.1, 7 pages.
Canadian Patent Office, Office Action mailed Dec. 1, 2015 for Application No. 2,657,094, 3 pages.
Canadian Patent Office, Office Action mailed Oct. 27, 2016, Application No. 2,657,094, 3 pages.
Intellectual Property of India, Office Action mailed Nov. 23, 2016, Application No. POD/Application No. 830/DELNP/2009, 8 pgs.

* cited by examiner

50

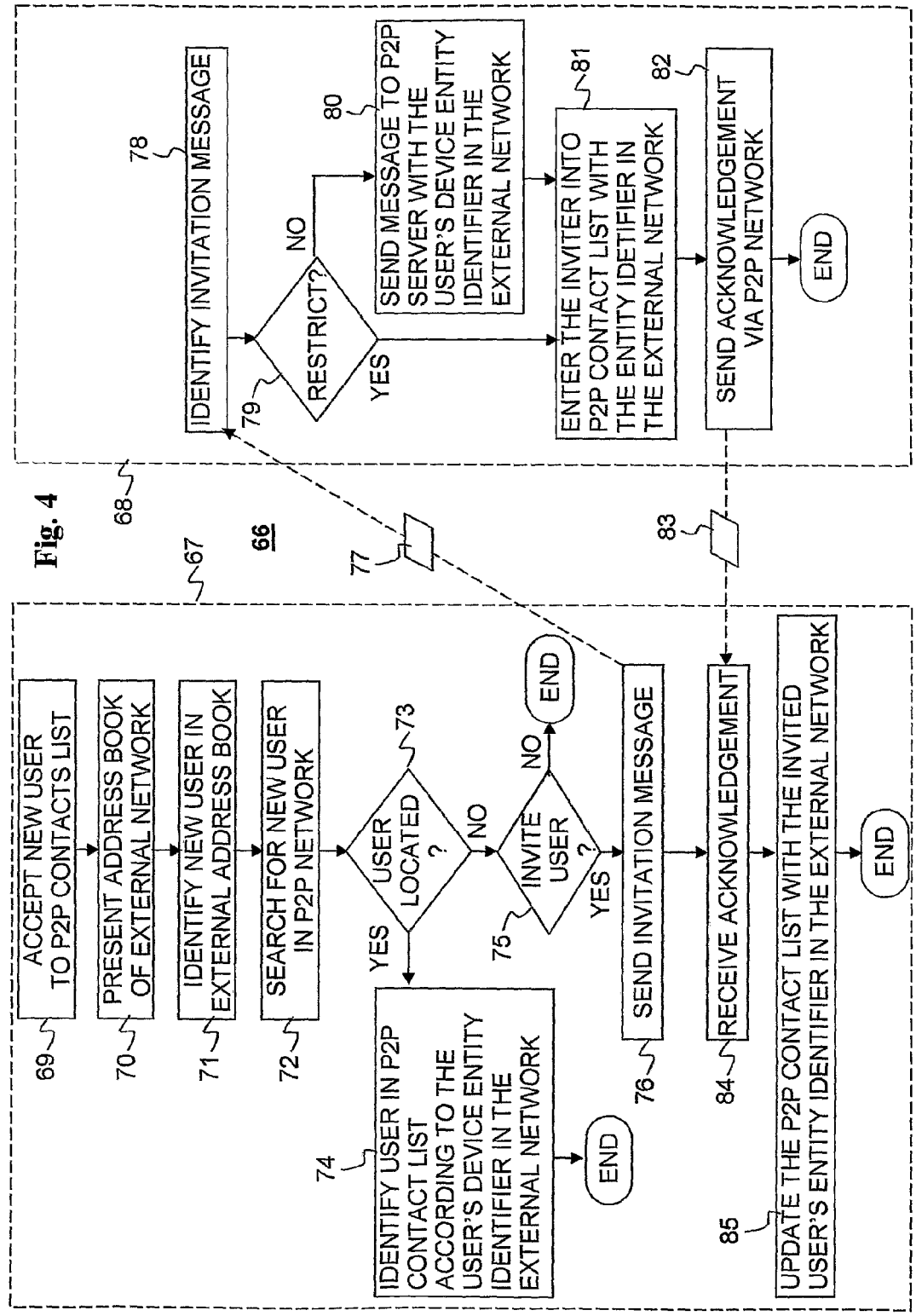

IDENTIFYING NETWORK ENTITIES IN A PEER-TO-PEER NETWORK

CROSS-REFERENCE TO RELATED APPLICATIONS

This application is a U.S. National Phase Application under 35 U.S.C. 371 of PCT International Application No. PCT/IL2007/000751, which has an international filing date of Jun. 20, 2006, and which claims priority from U.S. Provisional Patent Application No. 60/806,738, filed Jul. 7, 2006, entitled "Identifying Network Entities in a Peer-to-Peer Network", the disclosures of both of which are hereby incorporated by reference.

FIELD AND BACKGROUND OF THE INVENTION

The present invention relates to communication networks, and, more particularly but not exclusively, to identifying network entities in a peer-to-peer network that at least partly overlaps a conventional network.

A communication network assigns each entity of the network with a unique entity identifier. This identifier is typically made of a sequence of digits. Each user has to know the identifier of each target entity with which the user may want to establish communication. The user usually maintains an 'address book' where the identifiers are stored along with respective names, nicknames, or other means that enable the user to recognize the required addressee.

The proliferation of communication networks produces proliferation of personal address books. In many cases a user may subscribe to several communication services, thereby being assigned several identifiers, each for every network terminal in use. Therefore, a user may have several identifiers to reach the same person or business entity.

Furthermore, some networks, such as peer-to-peer networks, piggyback over traditional networks, using their physical infrastructure. In such case, the same network terminal may have two identifiers, a first identifier for the underlying conventional network and a second identifier for the peer-to-peer network.

This proliferation of network entity identifiers creates unnecessary redundancy, ambiguity and information overload.

Address translators are known for a long time, for example, as described in U.S. Pat. No. 6,661,799. However, address translators use predefined rules to convert an address valid in a first address realm into an address valid in a second address realm. Some entity in either address realms has to be aware of the requirement to translate the address and to access the address translator to perform the conversion.

There is thus a widely recognized need for, and it would be highly advantageous to have, a method and a system for identifying network entities devoid of the above imitations.

SUMMARY OF THE INVENTION

According to one aspect of the present invention there is provided a method for identifying a network entity within a first communication network, the method containing receiving an identification data of the network entity in a second communication network, and using the identification data of the network entity in the second communication network to identify the network entity in the first communication network.

According to another aspect of the present invention there is provided a method for identifying a network entity wherein the first communication network and the second communication network at least partially overlap.

According to another aspect of the present invention there is provided a method for identifying a network entity wherein the network entity is a member of both the first communication network and the second communication network.

According to yet another aspect of the present invention there is provided a method for identifying a network entity wherein the network entity is at least one of a network node, a network device, a network terminal, a network entity identification device, and a SIM card.

According to still another aspect of the present invention there is provided a method for identifying a network entity wherein the first communication network is a peer-to-peer network.

Further according to another aspect of the present invention there is provided a method for identifying a network entity wherein the second communication network is at least one of a telephone network, a public switched telephone network (PSTN), a public land mobile network (PLMN), a mobile telephone network, a cellular telephone network, a wireless network, a data communication network, an IP network, the Internet, a peer-to-peer network.

Still further according to another aspect of the present invention there is provided a method for identifying a network entity wherein the identification data is at least one of: a telephone number, a directory number (DN), NDN, a mobile station ISDN, a Mobile Station international ISDN Number, a Mobile Systems International Subscriber Identity Number, MSISDN, an international mobile subscriber identification, International Mobile Station Identity, IMSI, a nickname in a peer-to-peer network.

Even further according to another aspect of the present invention there is provided a method for identifying a peer in a peer-to-peer network, the method containing: receiving an identification data of a network entity in a telephone network, and using the identification data of the network entity in the telephone network to identify the peer in the peer-to-peer network.

Additionally according to another aspect of the present invention there is provided a network device operative to communicate with network entities in a first communication network, the network device containing: a device identification acquiring module operative to receive at least one entity identification information of at least one of the network entities, the entity identification information identifying at least one entity in a second communication network; and a communication module operative to communicate in the first communication network with the network entity according to the entity identification information of the network entity in the second communication network.

Also according to another aspect of the present invention there is provided a network device operative to communicate with network entities in a first communication network, also operative to receive at least one entity identification information identifying at least one entity in a second communication network; and also operative to communicate in the first communication network with the network entity according to the entity identification information of the network entity in the second communication network, wherein the first communication network is a peer-to-peer network.

Also according to yet another aspect of the present invention there is provided a computer program product, stored on one or more computer-readable media, containing instructions operative to cause a programmable processor of a network device to: receive an identification data of a network entity in a first communication network; and to identify the network entity in a second communication network using the identification data of the network entity in the first communication network Also according to still another aspect of the present invention there is provided a computer program product operative to cause a programmable processor of a network device to receive an identification data of a network entity in a first communication network; and to identify the network entity in a second communication network using the identification data of the network entity in the first communication network, wherein the second communication network is a peer-to-peer network.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 4 is a simplified flow chart of a process for validating the associating of an undisclosed entity identifier with a new address book entry according to a preferred embodiment of the present invention.

DESCRIPTION OF THE PREFERRED EMBODIMENTS

Figure 1:
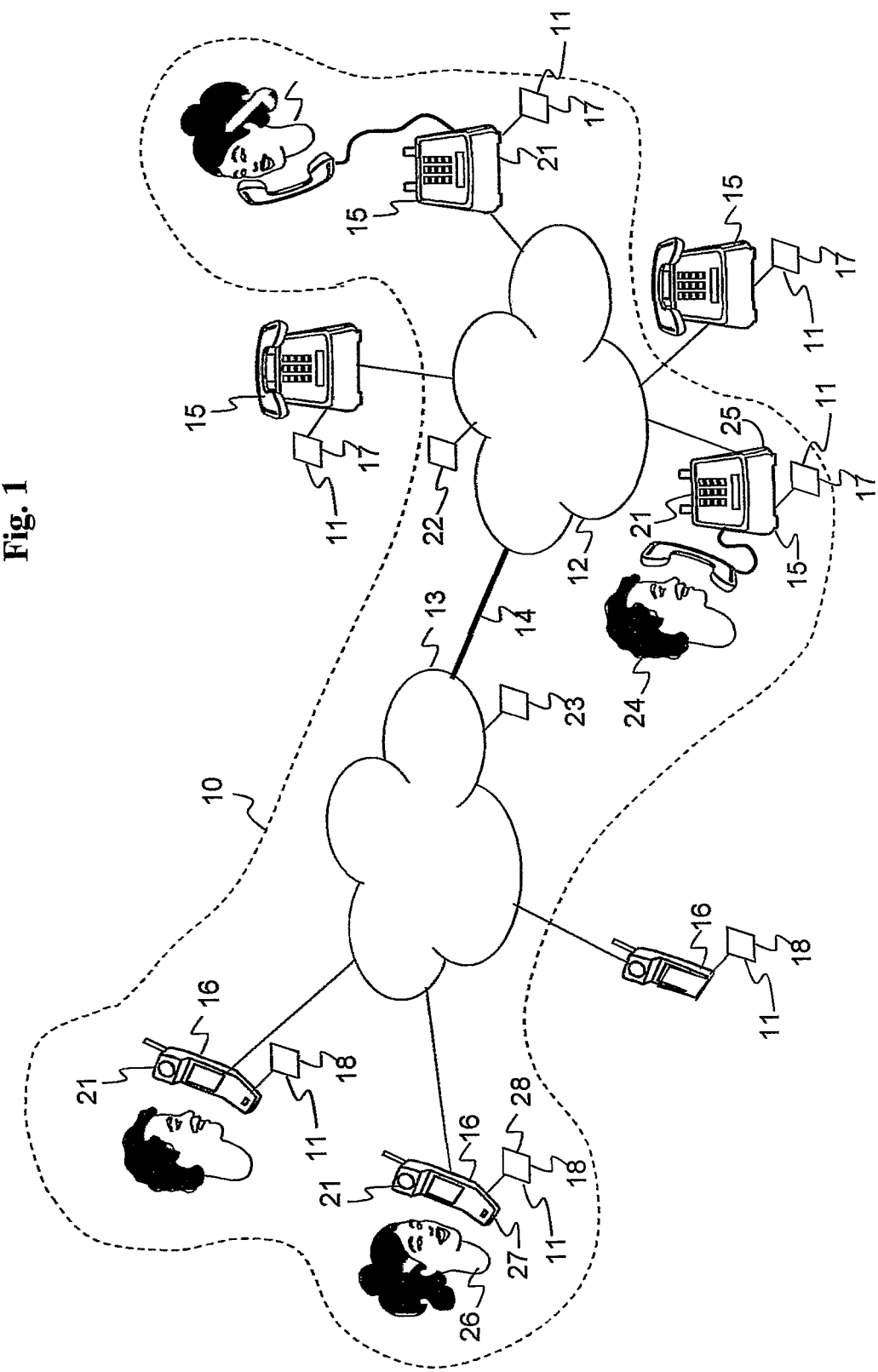
FIG. 1 is a simplified illustration of a peer-to-peer network using entity identifiers of another network as a network identifier in the peer-to-peer network, according to a preferred embodiment of the present invention.

The principles and operation of identifying network entities in one network using entity identifiers of another network according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments, of being practiced, or carried out in various ways. In addition, it is to be understood that the phraseology and terminology employed herein is for the purpose of description and should not be regarded as limiting.

In this document, an element of a drawing that is not described within the scope of the drawing and is labeled with a numeral that has been described in a previous drawing has the same use and description as in the previous drawings. Similarly, an element that is identified in the text by a numeral that does not appear in the drawing described by the text has the same use and description as in the previous drawings where it was described.

The present invention uses an entity identifier, as is defined and used in a first communication network, to identify an entity in a second communication network, while the usability of the entity identifier in the first communication network is maintained.

It is known in the art to track the user's location and divert the call accordingly, also known as 'single number service'. In this case, there are still different addressing identifiers associated with the different terminals (telephones).

Number portability enables a user to carry an addressing identifier (telephone number) between service providers. Number portability preserves the same single addressing identifier within the combined networks.

A SIM card can be transferred from one telephone to another, thus transferring the entity identifier between the telephones within the telephone network. This is similar to replacing a telephone set connected to a telephone line. The actual entity is the SIM card or telephone line, not the telephone set, and the entity identifier is not transferred and certainly not used in any different network.

It is also known in the art to use a nickname to identify a destination, as commonly used in address books, for example email address book, or storing telephone numbers associated with their respective user names in a telephone. In this methods it is the responsibility of each user to maintain the address book and associate different names to different addressing identifiers (email addresses, telephone numbers, etc.). The actual addressing identifiers are still set by each network according to the entity identification convention of the network.

It is also known in the art to use one addressing convention within another addressing convention. For example, using a name within an email address, such as john.doe@mail.com. However, this method just merges two different addressing conventions.

The prior art methods described above do not enable the use of an entity identifier in a first communication network, to identify entities in a second communication network.

The present invention enables a first communication network to use entity identifiers of one or more other (external) networks, as is, as entity identifiers within the first communication network. Thus, a user in the first communication network can address a network entity in that network, such as a terminal, a server, or a user, using the entity identifier of that target entity, in an external network.

Particularly, the present invention enables a user in a peer-to-peer network to address another peer in that peer-to-peer network, using the entity identifier of that target entity, in another (physical) network. It is appreciated that the peer-to-peer network can be disconnected from any of the other (external, physical) networks. It is also appreciated that the peer-to-peer network may operate on at least some of the other (external, physical) networks. Preferably, the external network is a mobile (cellular) network, and the entity identifier in the external network is preferably a directory number of a cellular telephone in the cellular network. Preferably, the present invention enables a first user in the peer-to-peer network to address a second user, who is also a peer in that peer-to-peer network, using the telephone number of the cellular telephone of the second user. That telephone number of the cellular telephone of the second user being the entity identifier of the cellular telephone in the cellular network.

Reference is now made to FIG. 1, which is a simplified illustration of a peer-to-peer network 10 using entity identifiers 11 of another network as a network identifier in the peer-to-peer network 10, according to a preferred embodiment of the present invention.

In the embodiment described in accordance with FIG. 1 the peer-to-peer network 10 preferably operates on two physical networks 12 and 13. Preferably, network 12 is a fixed telephone network, network 13 is a cellular telephone network and the two networks are connected via a connection 14.

It is appreciated that peer-to-peer network 10 can operate over a single network, whether a fixed network such as network 12 or a cellular network such as network 13 or over more than two physical networks. It is further appreciated that the physical networks can be connected, such as via connection 14, or disconnected. It is also appreciated that the physical networks may be telecom networks, datacom networks, wired networks, wireless networks, mobile networks, satellite networks, etc, and any combination thereof, including, but not limited to, telephone network, public switched telephone network (PSTN), public land mobile network (PLMN), a mobile telephone network, a cellular telephone network, a data communication network, an IP network and the Internet. It is further appreciated that for the purpose of the present invention another peer-to-peer network may also form a physical network for the peer-to-peer network 10.

Physical network 12 preferably provides service to network entities 15, and physical network 13 preferably provides service to network entities 16. Preferably, both networks assign entity identifiers 11 to their respective network entities. Physical network 12 preferably allocates a unique entity identifier 17 to each network entity 15 while physical network 13 preferably allocates a unique entity identifier 18 to each network entity 16. Typically for telephone networks, if for example networks 12 or 13 are telephone networks, the respective entity identifier 17 and 18 are telephone numbers. Such entity identifiers can also be known as directory numbers, NDN, a mobile station ISDN, a Mobile Station International ISDN Number, a Mobile Systems International Subscriber Identity Number, MSISDN, an international mobile subscriber identification, International Mobile Station Identity, IMSI, a nickname in a peer-to-peer network, etc.

It is appreciated that in this example network entities 15 and 16 are preferably terminal devices. However entities 15 and 16 can be any network entity that is allocated an entity identifier, such as a network server, network router, SIM card, etc.

In this example, network entities 21 are preferably peers in the peer-to-peer network 10. It is appreciated that the peer-to-peer network 10 can also provide service to peer devices which are not members of network 12 or 13 or any other network, such peer devices are not shown in FIG. 1 for simplicity.

The peer-to-peer network 10, being a network, should allocate unique identifiers to all network entities 21. If the peer-to-peer network 10 would generate and allocate its own unique identifiers to the network entities 21 each network entity 21 would have two unique identifiers, a first identifier allocated by the physical network (12 or 13) and a second unique identifier allocated by the peer-to-peer network 10. Instead, the peer-to-peer network 10 preferably uses the entity identifier (17 or 18) allocated to the network entity 21 by its respective physical network to identify the respective peer network entity 21.

It is obviously possible that two network entities, a first entity from the physical network 12 and a second entity from the physical network 13 would be allocated the same identifier by their respective physical networks. In such case, unique network identifiers 22 and 23 are preferably added to each entity identifier 17 or 18 respectively, to distinguish between the two network entities.

Network identifiers 22 and 23 can be allocated by the peer-to-peer network 10. However, typically, when the physical networks 12 and 13 are interconnected, either directly, such as via connection 14, or indirectly, for example when two networks are connected via a third network, the network identifiers are already allocated to these networks by another organization. For example, such network identifier can be a country code in the international telephone numbering plan. In such case, the peer-to-peer network 10 preferably uses these already allocated network identifiers.

Therefore, when a user of a first peer device, such as user 24 of peer device 25, wants to communicate with a user of a second peer device, such as user 26 of peer device 27, user 24 has to enter, or select from a list, such as an address book, the network identifier (23 in this example) and the entity identifier (28 in this example) of the second peer device (27 in this example). It is appreciated that if the two peer devices belong to the same physical network, the network identifier may be redundant. That is, if the network identifier is not presented, the peer-to-peer network 10 preferably assumes that the destination peer device has the same network identifier as peer device that initiates the communication.

Figure 2:
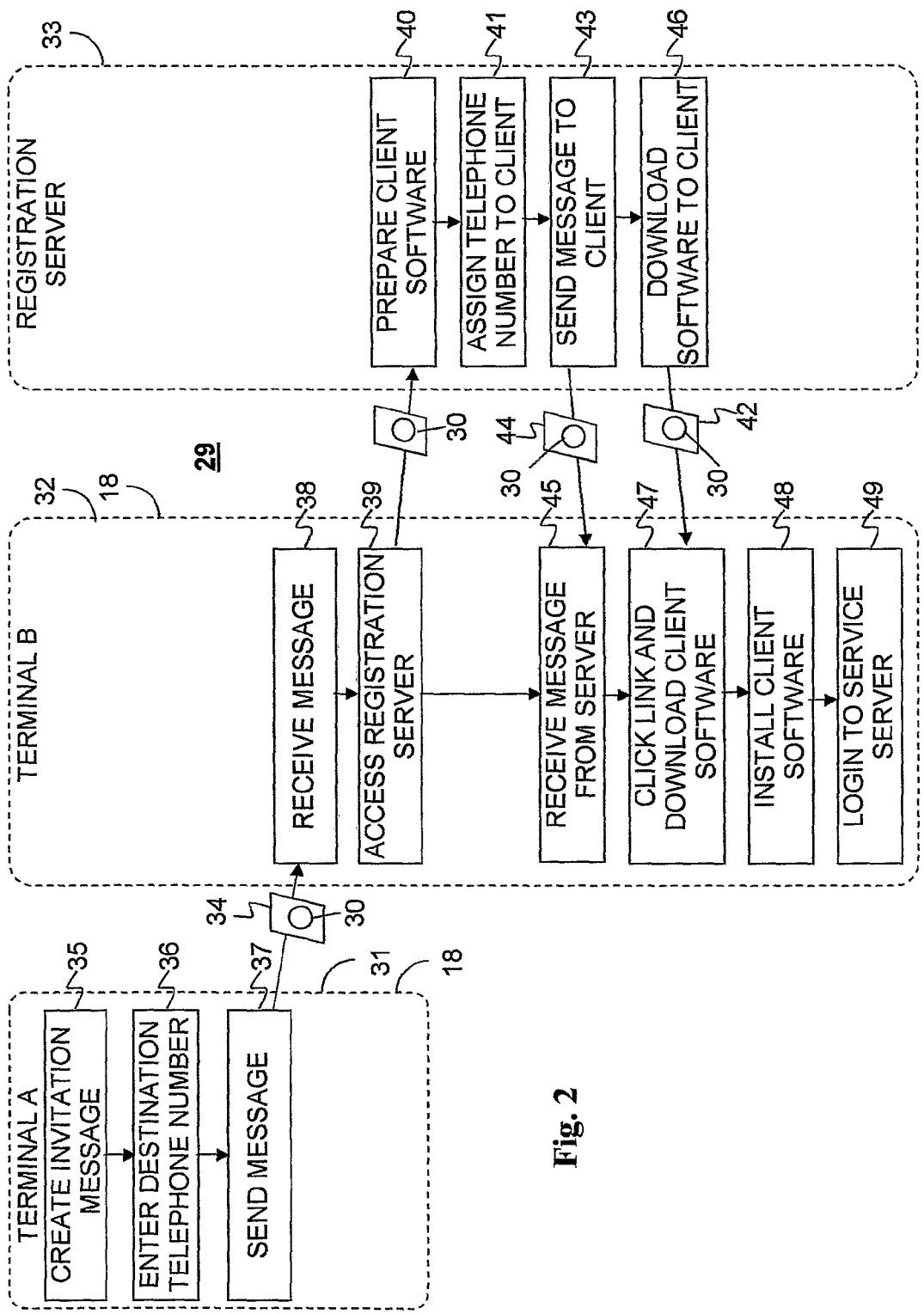
FIG. 2 is a simplified flow chart of a process of using an entity identifier of a cellular telephone network as an entity identifier in a peer-to-peer network, according to a preferred embodiment of the present invention.

Reference is now made to FIG. 2, which is a simplified flow chart of a process 29 of using an entity identifier 30 of a cellular telephone network as an entity identifier in a peer-to-peer network, according to a preferred embodiment of the present invention.

FIG. 2 shows the process 29, that preferably spans two terminals (31 and 32) and a registration server 33. Preferably, both terminals 31 and 32 are mobile network terminals 18 in the cellular telephone network 13 of FIG. 1. However, for the purpose of the process 29, terminals 31 and 32 can be any network terminals that can download client (terminal) software from a server connected to the network, or networks, to which terminals 31 and 32 are connected. Such terminal can be a PDA, a computer, an IP telephones, etc.

Terminal A (31) preferably invites terminal B (32) to join the peer-to-peer network (10 of FIG. 1), preferably by sending a message 34 to terminal B (32). In step 35, the user of terminal A (31) preferably creates a message to the user of terminal B (32). In step 36, the user of terminal A (31) preferably enters a destination number for the message, which is preferably the telephone number of terminal B (32), which is preferably the entity identifier 30 of the destination terminal device 32. In step 37, the user of terminal A (31) preferably sends the message 34 to terminal B (32).

In step 38 terminal B (32) preferably receives the message 34 and in step 39 the user of terminal B (32) preferably clicks on a link provided within the message 34 to access the registration server 33.

In step 40 the registration server 33 preferably receives from terminal B (32) the entity identifier 30 of terminal B (32) and preferably prepares (step 41) a client software 42. The client software 42 is preferably customized by the server 33 for the use of terminal B. (32). The terminal B (32) is preferably assigned with embedded entity identifier 30, which is also preferably embedded within the client software 42.

In step 43 the registration server 33 preferably sends to terminal B (32) a message 44, which preferably includes a link to load the client software 42, and optionally also includes the entity identifier 30.

In step 45 terminal B (32) preferably receives the message 44. The user of terminal B (32) then preferably clicks the link embedded in the message 44 and preferably loads the software 42 (step 46 and 47).

In step 48 the user of terminal B (32) preferably installs the client software 42 and is now able to login to the service server (step 49) and initiate or receive communications via the peer-to-peer network 10.

It is appreciated that preferably the entire process 29 is performed over one or more networks other than the peer-to-peer network 10. It is also appreciated that preferably steps 43-47 are performed, at least partly, via the network that assigned the entity identifier 30 to the terminal 32.

Figure 3:
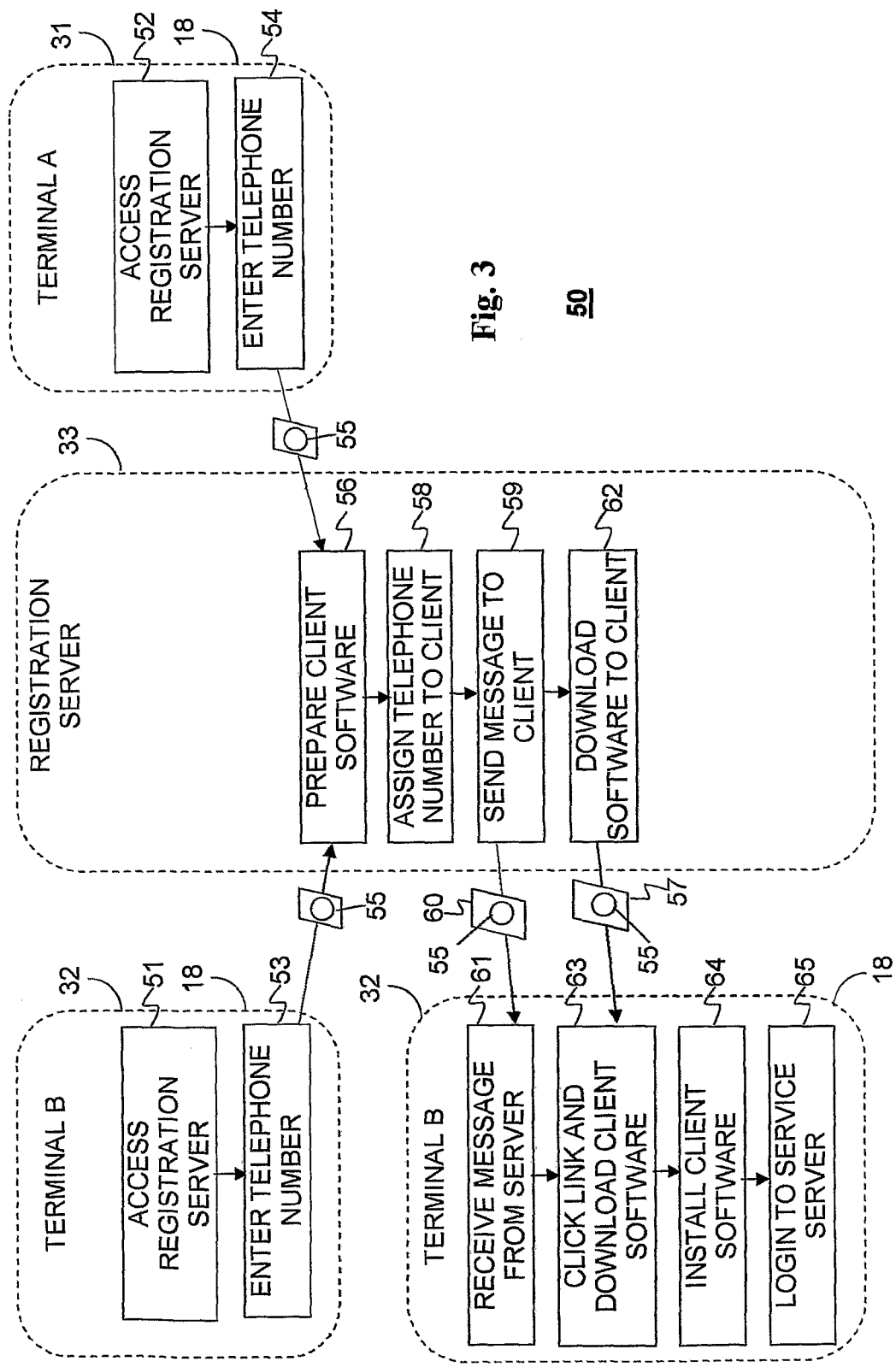
FIG. 3 is a simplified flow chart of another process of using an entity identifier of a cellular telephone network as an entity identifier in a peer-to-peer network, according to another preferred embodiment of the present invention.

Reference is now made to FIG. 3, which is a simplified flow chart of a process 50 of using an entity identifier of a cellular telephone network as an entity identifier in a peer-to-peer network, according to another preferred embodiment of the present invention.

As shown in FIG. 3, either terminal A 31 or terminal B 32 start the process preferably by accessing (steps 51 or 52 respectively) the registration server 33. Preferably, terminal A 32 is operated by a user wishing to join the peer-to-peer network 10 (Terminal B) or by a user wishing to invite another user to join the peer-to-peer network 10 (Terminal A).

Preferably, the terminal A 31 and the terminal B 32 are mobile network terminals 18 in a cellular telephone network 13 of FIG. 1. However, for the purpose of the process shown in FIG. 3, the terminal B 32 can be any network terminals that can download client (terminal) software from a server connected to the network, such as PDAs, computers, IP telephones, etc.

In steps 53 or 54, the user of terminal A 31 or the terminal B 32, respectively, preferably enters an entity identifier 55 of terminal B 32, preferably a telephone number.

In step 56 the registration server 33 preferably prepares a client software 57, customized for terminal B (32). In step 58 the server 33 preferably assigned the entity identifier 55 to the terminal B (32) and, preferably, also embeds the entity identifier 55 within the client software 57.

In step 59 the registration server 33 preferably sends to terminal B (32) a message 60, which preferably includes a link to load the client software 57, and optionally includes the network identifier 55.

In step 61 terminal B (32) preferably receives the message 60. The user of terminal B (32) then, preferably, clicks the link embedded in the message 60 and loads the software 57 (step 62 and 63).

In step 64 the user of terminal B (32) installs the client software 57 and is now able to login to the service server (step 65) and initiate or receive communication via the peer-to-peer network 10.

It is appreciated that preferably the entire process 50 is performed over one or more networks other than the peer-to-peer network 10. It is also appreciated that preferably steps 59-63 are performed, at least partly, via the network that assigned the entity identifier 55 to the terminal 32.

Reference is now made to FIG. 4, which is a simplified flow chart for associating an entry of a contact list of one peer with an undisclosed entity identifier of another peer, according to a preferred embodiment of the present invention.

It is appreciated that the registering user (such as the user of terminal B in the registration process described in accordance with FIG. 2) may prefer not to disclose the entity identifier, such as his or hers telephone number, to the public. The registering user may instruct, preferably within the step 39 of FIG. 2, not to send the entity identifier 30 to the registration server. Later on, the user of terminal B, now named the first user, may inform another user, now named the second user, of his membership in the peer-to-peer network 10. The second user now wishes to record the first user in his contact list for the peer-to-peer network 10 (herein below the P2P contact list). This contact list is preferably located in the network device, such as a cellular telephone of the second user, or in any other similar communication terminal, such as a laptop or a PDA. The second user prefers to identify the first user in his P2P contact list using the external network identifier, such as the cellular telephone number, of the first user. FIG. 4 describes a preferred invitation process 66 for associating a contact list entry of one peer (second user) with an undisclosed entity identifier of another peer (first user).

The flow chart of FIG. 4 preferably contains two modules: inviting module 67 and invited module 68.

The invited module 68 is preferably executed by a first network entity used by a first user. This first network entity is preferably a cellular telephone in a cellular telephone network such cellular telephone 16 in cellular network 13 of FIG. 1. The first network entity also functions as a peer device in a peer-to-peer network, such as network entity 21 in the peer-to-peer network 10 of FIG. 1. In the example of FIG. 4 the first network entity is registered in the peer-to-peer network 10 without disclosing its entity identifier, that is its telephone number, in the cellular network 13.

The inviting module 67 is preferably executed by a second network entity used by a second user. The second network entity is preferably also cellular telephone in a cellular telephone network such another cellular telephone 16 in cellular network 13 of FIG. 1. The second network entity also functions as a peer device in a peer-to-peer network, such as another network entity 21 in the peer-to-peer network 10 of FIG. 1.

As seen in FIG. 4, the invitation module 66 preferably starts with the inviting module 67 accepting a new user to the peer-to-peer contact list. In step 69 the second user preferably enters the contact details of the first user to the peer-to-peer contact list of the second network entity. In step 70 the invitation module 66 preferably presents to the second user the address book of the external network, such as the cellular network address book. The invitation module 66 preferably proceeds to step 71 in which the user identifies and selects the first user in the address book of the external (cellular) network. The invitation module 66 preferably proceeds to step 72 to retrieve the entity identifier of the second network entity in the external network. Step 72 then preferably searches the peer-to-peer network for the first user, that is for first network entity, using the entity identifier of the first network entity in the external (cellular) network. If the second network entity is located (step 73) then the invitation module 67 preferably proceeds to step 74 to associate and enter the entity identifier of the second network entity as the entity identifier of the second network entity in the peer-to-peer network. The invitation module 67 then preferably terminated.

However, since in this example the second user selected not to disclose the telephone number while registering to the peer-to-peer network, the invitation module 67 may fail to locate the first network entity in the peer-to-peer network using the entity identifier of the first network entity in the external network. In this case the invitation module 67 preferably proceeds to step 75 to propose to the second user to send an invitation to the first user. If the second user selects not to invite the first user the invitation module preferably terminates. If the second user selects to invite the first user the invitation module preferably proceeds to step 76 to send an invitation message 77 to the first network entity. The invitation message 77 is preferably sent to the first network entity preferably via the external network using the entity identifier of the first network entity in the external network. For example, the invitation message 77 is sent as an SMS message in a cellular network.

The invitation process 66 preferably continues in step 78 of the invited module 68 where the invited module 68 preferably identifies the invitation message 77. The invited module 68 preferably proceeds to step 79 to check if the first user selected to restrict the distribution of the entity identifier. If the distribution is not restricted the invited module 68 preferably proceeds to step 80 to send a message to peer-to-peer server. This message preferably contains the user's device entity identifier in the external network. The invited module 68 then preferably proceeds to step 81.

If the distribution is not restricted the invited module 68 preferably proceeds to step 81 to enter the second network entity into the peer-to-peer contact list of the first network entity using the entity identifier of the second network entity in the external network. The invited module 68 then preferably proceeds to step 82 to send an acknowledgement message 83 to second network entity, and then preferably terminates. The acknowledgement message 83 is preferably sent to the second network entity via the peer-to-peer network.

The invitation process 66 then preferably proceeds with step 84 of the inviting module 67 to receive the acknowledgement message 83. When the acknowledgement message 83 is received the inviting module 67 executes step 85 preferably updating the record of the first user in the contact list of the peer-to-peer network with the entity identifier of the second network entity in the external network. The inviting module 67 and the invitation process 66 then preferably terminate.

It is expected that during the life of this patent many relevant methods and systems for identifying entities in communication networks will be developed, and the scope of the terms herein, particularly of the terms "identity" and "identification", is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method for identifying a first network entity within a first communication network, said method executed by a processor of a network device, said method comprising:

receiving an entity identification data of said first network entity in a second communication network, said first and second communication networks having a different entity identification convention, said first communication network being a peer-to-peer network;

using said entity identification data of said first network entity in said second communication network as an identity of said first network entity in said first communication network, wherein said entity identification data, when used in said first communication network, comprises the same form of said entity identification data when used in said second communication network;

inviting a second network entity to the first communication network through an invite sent to the second network entity over said second communication network;

receiving an acknowledgement to said invite from said second network entity over said first communication network; and downloading to said second network entity, executable client software from a registration server, the client software having an identifier for the second network entity embedded therein.

2. A method for identifying a first network entity according to claim 1 wherein said first communication network and said second communication network at least partially overlap.

3. A method for identifying a first network entity according to claim 1 wherein said first network entity is a member of both said first communication network and said second communication network.

4. A method for identifying a first network entity according to claim 1 wherein said first network entity is at least one of a network node, a network device, a network terminal, and a network entity identification device.

5. A method for identifying a first network entity according to claim 1 wherein said second communication network is at least one of a telephone network, a public switched telephone network (PSTN), a public land mobile network (PLMN), a mobile telephone network, a cellular telephone network, a wireless network, a data communication network, and an IP network.

6. A method for identifying a first network entity according to claim 1 wherein said entity identification data is at least one of: a telephone number, a directory number (DN), NDN, a mobile station ISDN, a Mobile Station International ISDN Number, a Mobile Systems International Subscriber Identity Number, MSISDN, an international mobile subscriber identification, International Mobile Station Identity, and IMSI.

7. A method for identifying a peer in a peer-to-peer network, said method executed by a processor of a network device, said method comprising:
receiving an entity identification data of a first network entity in a telephone network selected from a group consisting of: public switched telephone network (PSTN) and public land mobile network (PLMN);
using said entity identification data of said first network entity in said telephone network to identify said peer in said peer-to-peer network;
inviting a second network entity to the peer-to-peer network through an invite sent to the second network entity over the telephone network;
receiving an acknowledgement to said invite from said second network entity over said peer-to-peer network; and
downloading to said second network entity, executable client software from a registration server, the client software having an identifier for the second network entity embedded therein.

8. A method for identifying an addressable peer in a peer-to-peer network, said method comprising:
receiving, at an addressing peer, an entity identification data of said addressable peer in said peer-to-peer network, said addressing peer also being a first network entity in a communication network other than said peer-to-peer communication network;
receiving an entity identification data of a second network entity in said network other than said peer-to-peer communication network, said second network entity also being said addressable peer in said peer-to-peer network;
inviting a second network entity to the peer-to-peer network, the inviting comprising sending an invitation message from said first network entity to said second network entity via said communication network other than said peer-to-peer communication network and using said identification data of said second network entity in said communication network other than said peer-to-peer communication network;
receiving acknowledgement message, by said addressing peer from said addressable peer via said peer-to-peer network, said acknowledgement message acknowledging said invitation message;
associating, in said addressing peer said addressable peer with said entity identification data to enable identification of said addressable peer in said peer-to-peer network using said entity identification data of said second network entity in said communication network other than said peer-to-peer communication network; and
downloading to said second network entity, executable client software from a registration server, the client software having an identifier for the second network entity embedded therein.

9. A network device operative to communicate with network entities in a first communication network, said network device comprising a memory and a data processor to:
receive an entity identification information uniquely identifying a network entity in a second communication network;
communicate in said first communication network with said network entity, said communication module also operative to identify said network entity in said first communication network according to said entity identification information of said network entity in said second communication network, wherein said first and second communication networks having a different entity identification convention, and wherein said entity identification data, when used in said first communication network, comprises the same form of said entity identification data when used in said second communication network; and
invite another network device to the first communication network by sending an invite to the other network device over said second communication network;
receive an acknowledgement to said invite from the other network device over said first communication network; and
download to said second network entity, executable client software from a registration server, the client software having an identifier for the second network entity embedded therein;
wherein said first communication network is a peer-to-peer network.

10. A network device according to claim 9 wherein said second communication network is at least one of: a telephone network, a public switched telephone network (PSTN), a public land mobile network (PLMN) a mobile telephone network, a cellular telephone network, a wireless network, a data communication network, an IP network, the Internet, and a peer-to-peer network.

11. A network device according to claim 9 wherein said network entity is at least one of a network node, a network device, a network terminal, and a network entity identification device.

12. A network device according to claim 9 wherein said entity identification data is at least one of: a telephone number, a directory number (DN), NDN, a mobile station ISDN, a Mobile Station International ISDN Number, a Mobile Systems International Subscriber Identity Number, MSISDN, an international mobile subscriber identification, International Mobile Station Identity, IMSI, and a nickname in a peer-to-peer network.

13. A system for identifying an addressable peer in a peer-to-peer network, said system comprising: an addressing peer, being a peer in said peer-to-peer network, and also being a first network entity in a communication network other than said peer-to-peer communication network, said addressing peer comprising a data processor to:
receive a first entity identification data of said addressable peer in said peer-to-peer network;
receive a second entity identification data of a second network entity in said communication network other than said peer-to-peer communication network, said second network entity also performing as said addressable peer in said peer-to-peer network;
invite said second network entity to said peer-to-peer communication network, wherein to invite said second network entity, the data processor is to send an invitation message via said communication network other than said peer-to-peer communication network to said second network entity;
receive an acknowledgement message via said peer-to-peer network from said second network entity, said acknowledgement message acknowledging said invitation message;
identify said addressable peer according to said second entity identification data; and
download to said second network entity, executable client software from a registration server, the client software having an identifier for the second network entity embedded therein.

14. A computer program product comprising:
a non-transitory computer-readable storage medium; and
computer-readable program code embodied in said computer-readable storage medium,
wherein the computer-readable program code is configured to cause a programmable processor of a network device to
receive an entity identification data of a network entity in a first communication network;
identify said network entity in a second communication network using said entity identification data of said network entity in said first communication network, said first and second communication networks having a different entity identification convention;
invite another network device to the first communication network, wherein to invite the other network device, the computer-readable program code is further configured to cause the network device to send an invite to the other network device over said first communication network, the invite inviting the other network device to the first communication network;
receive an acknowledgement to said invite from the other network device over said second communication network; and
download to said other network device, executable client software from a registration server, the client software having an identifier for the other network device embedded therein.

15. A computer program product according to claim 14 wherein said second communication network is a peer-to-peer network.

16. A computer program product according to claim 14 wherein said first communication network and said second communication network at least partially overlap.

17. A computer program product according to claim 14 wherein said network entity is a member of both said first communication network and said second communication network.

18. A computer program product according to claim 14 wherein said network entity is at least one of a network node, a network terminal, and a network entity identification device.

19. A computer program product according to claim 14 wherein said first communication network is a network other than a peer-to-peer network.

20. A computer program product according to claim 14 wherein said second communication network is at least one of a telephone network, a public switched telephone network (PSTN), a public land mobile network (PLMN), a mobile telephone network, a cellular telephone network, a wireless network, a data communication network, an IP network, the Internet, and a peer-to-peer network.

21. A computer program product comprising:
a non-transitory computer-readable storage medium; and
computer-readable program code embodied in said computer-readable storage medium, wherein the computer-readable program code is configured to cause a programmable processor of a network device to
receive an entity identification data of a network entity in a telephone network; and
use said entity identification data of said network entity in said telephone network to identify said network device in a peer-to-peer network, said telephone network and said peer-to-peer network having a different entity identification convention;
invite another network device to the peer-to-peer network, wherein to invite the other network device, the computer-readable program code is further configured to cause the network device to send an invite to the other network device over said telephone network, the invite inviting the other network device to the first communication network; and
receive an acknowledgement to said invite from the other network device over said peer-to-peer network; and
download to said other network device, executable client software from a registration server, the client software having an identifier for the other network device embedded therein.

22. A computer program product comprising:
a non-transitory computer-readable storage medium; and
computer-readable program code embodied in said computer-readable storage medium, wherein the computer-readable program code is configured to cause a programmable processor of a network device to
receive, at an addressing peer, an entity identification data of an addressable peer in said peer-to-peer network, said addressing peer also being a first network entity in a communication network other than said peer-to-peer communication network;
receive an entity identification data of a second network entity in said communication network other than said peer-to-peer communication network; said second network entity also being said addressable peer in said peer-to-peer network;
invite the second network entity to the peer-to-peer network, wherein to invite the second network entity, the computer-readable program code is further configured to cause the network device to send an invitation message from said first network entity to said second network entity via said communication network other than said peer-to-peer communication network, the invitation message inviting the second network entity to the first communication network;
receive acknowledgement message, by said addressing peer from said addressable peer via said peer-to-peer network, said acknowledgement message acknowledging said invitation message; and
associate, in said addressing peer said addressable peer with said entity identification data to enable identification of said addressable peer in said peer-to-peer network using said entity identification data of said second network entity in said communication network other than said peer-to-peer communication network; and download to said second network entity, executable client software from a registration server, the client software having an identifier for the second network entity embedded therein.

23. A communication method executed by a processor of a first network entity, said method comprising:
sending a request to register in a first communication network, said request sent from the first network entity to a second network entity via a second communication network using identification data identifying said second network entity in said second communication network, the request comprising an identifier for the first network entity, the first communication network being a peer-to-peer network;
receiving a message from the second network entity, said message sent via said second communication network using said identification data identifying said second network entity in said second communication network;
downloading executable client software from a registration server, the client software having the identifier for the first network entity embedded therein; and
establishing communication via said first communication network.

24. A communication method executed by a processor of a network entity, said method comprising:
sending a request to register the network entity in a first communication network, said request sent to a server of said first communication network and comprising an identity of said network entity in a second communication network, the first communication network being a peer-to-peer network;
receiving a message from said server of said first communication network, said message sent via said second communication network using said identification data identifying said second network entity in said second communication network;
downloading to the network entity, executable client software from the server, the client software being pre-customized for the network entity, the client software having the identity for the network entity embedded therein; and
establishing communication, by said network entity, via said first communication network.

25. A communication method executed by a processor of a network device, said method comprising:
sending a request to respond in a first communication network, the request including an invite to join the first network, said request sent from a first network entity to a second network entity via a second communication network using identification data identifying said second network entity in said second communication network, the first communication network being a peer-to-peer network; and
receiving, via said first communication network, said response from said second network entity;
downloading to said first network entity, executable client software from a registration server, the client software having the identifier for the first network entity embedded therein.

26. A method for facilitating communication, the method comprising:
receiving, via a first communications network, a request from a first communications device to communicate with a second communications device via said first communications network, the first communication network being a peer-to-peer network,
wherein said request includes an identifier identifying said second communications device within a second communications network, and
wherein said identifier does not identify said second communications device within said first communications network;
sending, via said second communications network, a communication to said second communications device, wherein said communication requests that said second communications device join said first communications network and communicate via said first communications network; and
facilitating communication between said first communications device and said second communications device via said first communications network;
downloading to said second communications device, executable client software from a registration server, the client software having an identifier for the second communications device embedded therein.

27. The method of claim 26 wherein said communication sent to said second communications device comprises an invitation to said second communications device to communicate with said first communication device via said first communications network.

28. A network device comprising a processor for performing the steps of:
receiving, via a first communications network, a request from a first communications device to communicate with a second communications device via said first communications network, the first communications network being a peer-to-peer network,
wherein said request includes an identifier identifying said second communications device within a second communications network, and
wherein said identifier does not identify said second communications device within said first communications network;
sending, via said second communications network, a communication to said second communications device, wherein said communication requests that said second communications device join said first communications network and communicate via said first communications network;
receiving, via said first communications network, a response from said second communications device; and
facilitating communication between said first communications device and said second communications device via said first communications network; and
downloading to said second communications device, executable client software from a registration server, the client software having the identifier for the second communications device embedded therein.

* * * * *